US012454740B2

(12) United States Patent
Kanauchi et al.

(10) Patent No.: US 12,454,740 B2
(45) Date of Patent: Oct. 28, 2025

(54) ALLOY FOR RESISTOR AND USE OF RESISTOR ALLOY IN RESISTOR

(71) Applicant: KOA CORPORATION, Nagano (JP)

(72) Inventors: Naoki Kanauchi, Nagano (JP); Yoshitaka Kumeda, Nagano (JP); Tadahiko Yoshioka, Nagano (JP)

(73) Assignee: KOA CORPORATION, Nagano (JP)

( * ) Notice: Subject to any disclaimer, the term of this patent is extended or adjusted under 35 U.S.C. 154(b) by 381 days.

(21) Appl. No.: 17/915,677

(22) PCT Filed: Mar. 22, 2021

(86) PCT No.: PCT/JP2021/011623
§ 371 (c)(1),
(2) Date: Sep. 29, 2022

(87) PCT Pub. No.: WO2021/200326
PCT Pub. Date: Oct. 7, 2021

(65) Prior Publication Data

US 2023/0133344 A1 May 4, 2023

(30) Foreign Application Priority Data

Apr. 1, 2020 (JP) ................................ 2020-066078

(51) Int. Cl.
*C22C 9/05* (2006.01)
*C22C 1/04* (2023.01)
*H01C 1/14* (2006.01)

(52) U.S. Cl.
CPC .............. *C22C 9/05* (2013.01); *C22C 1/0425* (2013.01); *H01C 1/14* (2013.01)

(58) Field of Classification Search
CPC ... C22C 9/05; C22C 22/00; C22C 9/06; C22F 1/08; C22F 1/16
See application file for complete search history.

(56) References Cited

U.S. PATENT DOCUMENTS

2016/0115570 A1 4/2016 Zuckermann

FOREIGN PATENT DOCUMENTS

JP 2016-528376 A 9/2016
RU 2450197 C1 5/2012

OTHER PUBLICATIONS

International Search Report, English translation, from Application No. PCT/JP2021/011623, dated Jun. 1, 2021, 2 pages.
Written, including English translation, from Application No. PCT/JP2021/011623, dated Jun. 1, 2021, 8 pages.

*Primary Examiner* — Jessee R Roe
(74) *Attorney, Agent, or Firm* — Crowell & Moring LLP

(57) ABSTRACT

Provided is a copper-manganese-nickel based alloy having characteristics (in particular, specific resistance) close to those of a nickel-chromium based alloy. It is also an objective to provide an alloy having high processability compared to a nickel-chromium based alloy. An alloy for a resistive body includes copper, manganese, and nickel, wherein the manganese is 33 to 38% by mass, and the nickel is 8 to 15% by mass.

3 Claims, 8 Drawing Sheets

ALLOY FOR RESISTOR AND USE OF RESISTOR ALLOY IN RESISTOR

RELATED APPLICATIONS

This application is a 371 application of PCT/JP2021/011623 having an international filing date of Mar. 22, 2021, which claims priority to JP 2020-066078 filed Apr. 1, 2020, the entire content of each of which is incorporated herein by reference.

TECHNICAL FIELD

The present invention relates to an alloy for a resistor and to use of a resistor alloy in a resistor.

BACKGROUND ART

Examples of resistive alloys for resistors used for current detecting and the like include a copper-manganese based alloy, a copper-nickel based alloy, a nickel-chromium based alloy, and an iron-chromium based alloy. Generally, copper-manganese based alloys (copper-manganese-nickel based alloys) having a specific resistance of 29 μΩ·cm or more and 50 μΩ·cm or less are commercially available. Regarding nickel-chromium-aluminum-copper alloys, those having a specific resistance of 120 μΩ·cm or more are commercially available.

An invention of resistive alloys is known from prior literature 1 indicated below. Patent Literature 1 discloses a resistive alloy having a specific resistance of 80 to 115 μΩ·cm. As resistive alloys having a high specific resistance of 100 μΩ·cm or more, nickel-chromium based alloys and iron-chromium alloys are known; however, resistive alloys having a specific resistance on the order of 150 μΩ·cm are not commercially available.

CITATION LIST

Patent Literature

Patent Literature 1: JP 2016-528376 A

SUMMARY OF INVENTION

Technical Problem

Nickel-chromium based alloys and iron-chromium based alloys have their respective problems. Specifically, while the nickel-chromium alloys have a high specific resistance of 117 to 143 μΩ·cm or more, they are difficult to be formed into a resistive alloy having a low TCR, and their processability is low. While the iron-chromium based alloys have a specific resistance of 140 μΩ·cm or more, the alloys are not commonly used for resistors due to their low processability and magnetic properties.

It is an objective of the present invention to provide a copper-manganese-nickel based alloy having characteristics (in particular, specific resistance) close to those of a conventionally known nickel-chromium based alloy.

Another objective is to provide an alloy having high processability compared to a nickel-chromium based alloy.

Solution to Problem

According to an aspect of the present invention, there is provided a resistive body alloy including copper, manganese, and nickel, wherein the manganese is 33 to 38% by mass, and the nickel is 8 to 15% by mass.

Preferably, the resistive body alloy may have a specific resistance of 117 to 143 μΩ·cm.

Preferably, the resistive body alloy may have a Vickers hardness of 200 HV or less. The resistive body alloy may include 0.5% by mass or less of tin, or 0.5% by mass or less of iron.

The present invention may provide use of the above resistive body alloy in a resistor.

The present description incorporates the contents disclosed in JP Patent Application No. 2020-066078, from which the present application claims priority.

Advantageous Effects of Invention

According to the present invention, it is possible to provide a copper-manganese-nickel based alloy having characteristics (in particular, specific resistance) close to those of a nickel-chromium based alloy. Specifically, it is possible to provide an alloy having high processability compared to a nickel-chromium based alloy.

DESCRIPTION OF EMBODIMENTS

In the following, an alloy for a resistor and use of the resistor alloy in a resistor according to embodiments of the present invention will be described with reference to the drawings.

First Embodiment

Figure 1:
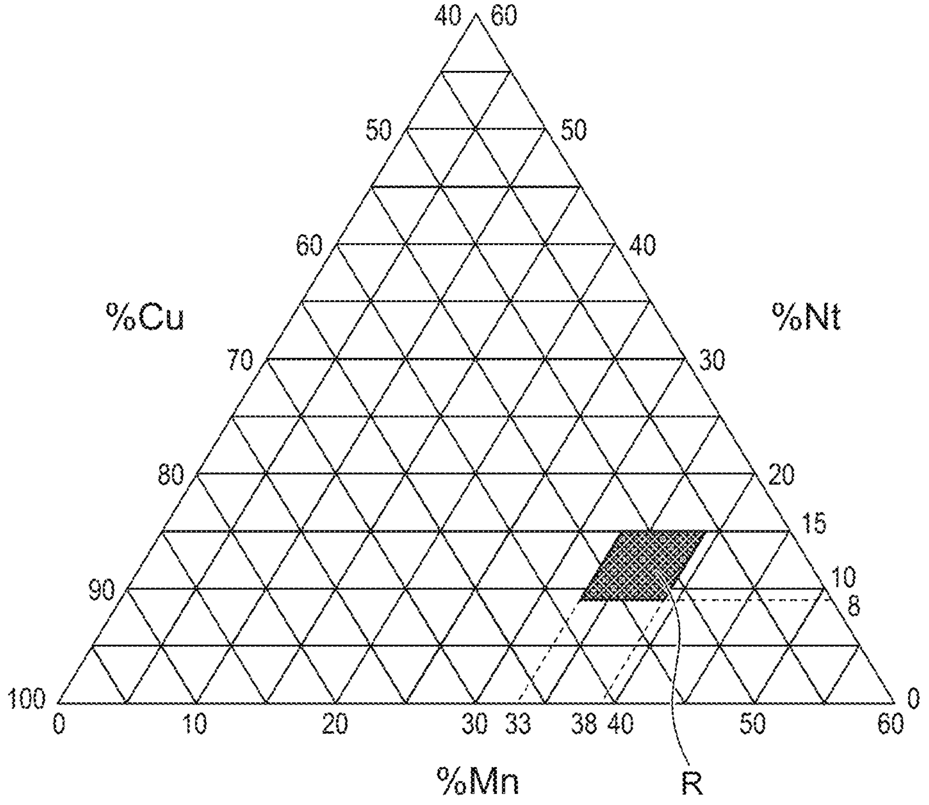
FIG. 1 illustrates a ternary alloy of an alloy for a resistive body including copper, manganese, and nickel according to an embodiment.

A first embodiment of the present invention will be described. FIG. 1 is a phase diagram of a copper-manganese-nickel alloy according to the embodiment.

Herein, the mass fraction of copper is shown on the left-upper side axis, and the mass fraction of nickel is shown on the right-upper side axis. The mass fraction of manganese is shown on the bottom side axis.

FIG. 1 shows a solid region R characterizing the resistive alloy of the present invention. In the region R, the mass fraction of manganese is 33% to 38%, and the mass fraction of nickel is 8% to 15%. The remainder is copper.

A portion of the nickel may be replaced with 0 to 0.5% by mass of tin or 0 to 0.5% by mass of iron.

Figure 2:
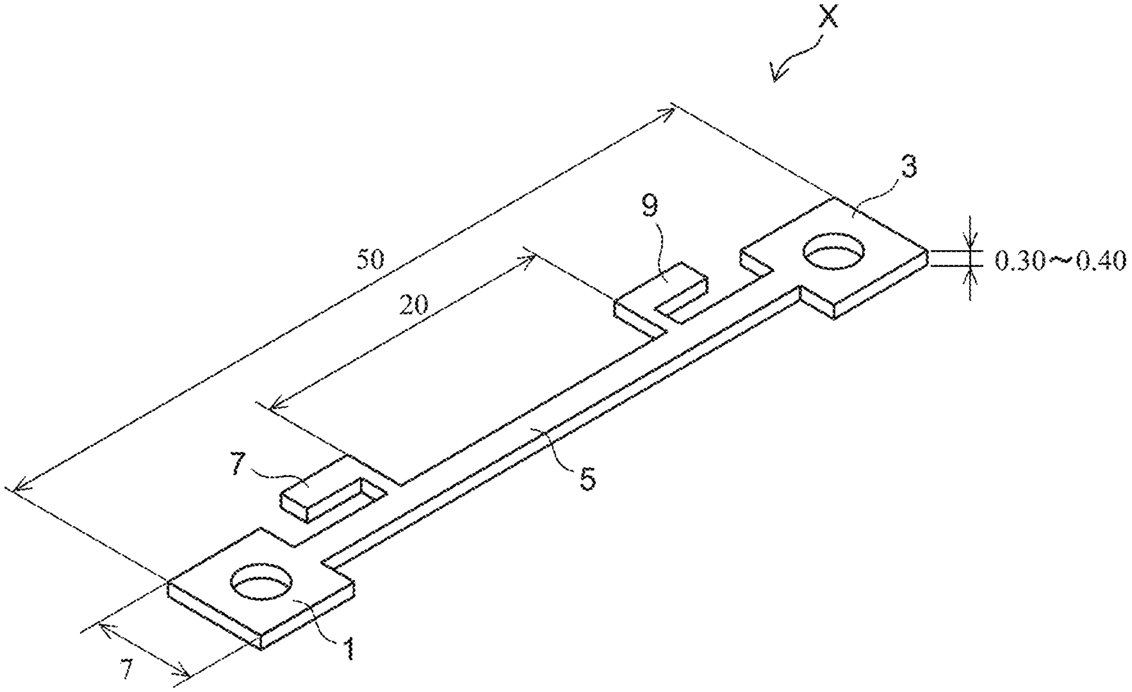
FIG. 2 is a perspective view of an example of an element for evaluating electrical characteristics of an alloy.

FIG. 2 illustrates a shape of an evaluation sample for the alloy for the resistor according to the embodiment of the present invention.

As illustrated in FIG. 2, the evaluation sample X for the alloy for a resistor includes: electrode portions (through which a current flows) 1, 3 at both ends; a resistive body 5 extending between the electrode portions 1, 3; and voltage detecting portions 7, 9 which are closer to the center than the ends of the resistive body 5 are. The distance between the electrode portions 1, 3 is 50 mm. The distance between the voltage detecting portions 7, 9 is 20 mm.

An example of the manufacturing process for the evaluation sample will be briefly described:

1) Raw material is weighed.
2) Material of 1) is dissolved.
3) Turned into hoop material of a predetermined thickness by means of a cold rolling mill.
4) In a vacuum gas replacement furnace, heat treatment is performed in an $N_2$ atmosphere at 500 to 700° C. for 1 to 2 hours.
5) From the hoop material, a resistive body sample having the shape of FIG. 2 is made by pressing.
6) In the vacuum gas replacement furnace, heat treatment (low-temperature heat treatment) is performed in an $N_2$ atmosphere at 200 to 400° C. for 1 to 4 hours.

The respective mass fractions of the alloy components in the region R are adjusted relative to each other so that the resistive alloy has the following characteristics.

(Proper Conditions)

1) Specific resistance is 117 to 143 μΩ·cm.
2) Temperature coefficient of resistance (TCR) is ±30 ppm/k.
3) Thermoelectromotive force with respect to copper is within ±2.5 IV/K.
4) Alloy has a smaller Vickers hardness (200 HV or less) than a nickel-chromium alloy and an iron-chromium alloy, and is easy to process. If the Vickers hardness is greater than 200 HV, cracking may occur during a rolling process, for example. In order to prevent this, counter-measures, such as heat treatment, may become necessary. More preferably, the Vickers hardness is 170 HV or less. Preferably, the Vickers hardness may be 100 HV or more in view of pressing performance, mechanical strength, and the like. Further, the sheet resistance may be increased.

TABLE 1

| Sample No. | Composition of sample | Composition (% by mass) Mn | Ni | Fe | Sn | Cu | Specific resistance (μΩ · cm) | TCR ($\times 10^{-6}$/K) 25-100° C. | Thermoelectromotive force with respect to copper (μV/K) 0-100° C. | Vickers hardness (HV) | Determination |
|---|---|---|---|---|---|---|---|---|---|---|---|
| 1 | 25Mn | 25 | — | — | — | Bal | 86 | 3 | 3.18 | 132 | x |
| 2 | 25Mn—10Ni | 25 | 10 | — | — | Bal | 89 | −14 | 0.86 | 160 | x |
| 3 | 25Mn—15Ni | 25 | 15 | — | — | Bal | 97 | −47 | −0.31 | 174 | x |
| 4 | 30Mn | 30 | — | — | — | Bal | 108 | 12 | 3.79 | 179 | x |
| 5 | 30Mn—8Ni | 30 | 8 | — | — | Bal | 107 | −5 | 1.93 | 139 | x |
| 6 | 30Mn—10Ni | 30 | 10 | — | — | Bal | 109 | −15 | 1.34 | 151 | x |
| 7 | 30Mn—15Ni | 30 | 15 | — | — | Bal | 114 | −37 | 0.53 | 175 | x |
| 8 | 30Mn—20Ni | 30 | 20 | — | — | Bal | 117 | −70 | −0.29 | 159 | x |
| 9 | 33Mn—10Ni | 33 | 10 | — | — | Bal | 122 | −9 | 1.71 | 152 | ○ |
| 10 | 35Mn | 35 | — | — | — | Bal | 121 | 28 | 3.19 | 184 | x |
| 11 | 35Mn—7.5Ni | 35 | 7.5 | — | — | Bal | 125 | 0 | 2.56 | 135 | x |
| 12 | 35Mn—8Ni | 35 | 8 | — | — | Bal | 125 | 0 | 2.41 | 138 | ○ |
| 13 | 35Mn—9.5Ni | 35 | 9.5 | — | — | Bal | 126 | −6 | 2.05 | 139 | ○ |
| 14 | 35Mn—15Ni | 35 | 15 | — | — | Bal | 129 | −28 | 0.71 | 169 | ○ |
| 15 | 35Mn—16Ni | 35 | 16 | — | — | Bal | 130 | −32 | 0.53 | 172 | x |
| 16 | 36Mn—10Ni | 36 | 10 | — | — | Bal | 130 | −6 | 2.06 | 155 | ○ |
| 17 | 36Mn—10Ni—0.3Fe | 36 | 10 | 0.3 | — | Bal | 130 | −20 | 1.9 | 158 | ○ |
| 18 | 36Mn—10Ni—0.5Fe | 36 | 10 | 0.5 | — | Bal | 132 | −27 | 1.72 | 155 | ○ |
| 19 | 36Mn—10Ni—0.5Sn | 36 | 10 | — | 0.5 | Bal | 132 | −19 | 1.94 | 160 | ○ |
| 20 | 36Mn—10Ni—1.0Sn | 36 | 10 | — | 1 | Bal | 134 | −31 | 1.93 | 164 | x |
| 21 | 38Mn—10Ni | 38 | 10 | — | — | Bal | 138 | −4 | 2.09 | 145 | ○ |
| 22 | 40Mn—10Ni | 40 | 10 | — | — | Bal | 145 | −2 | 2.26 | 152 | x |
| 23 | 38Mn—3Ni—1.5Sn | 38 | 3 | — | 1.5 | Bal | 142 | −33 | 3.4 | 140 | x |

Table 1 shows, for alloy materials of sample numbers 1 to 23, the composition (% by mass), specific resistance, TC&, thermoelectromotive force with respect to copper, Vickers hardness, and a determination result as to whether the characteristics are appropriate or not ("O"=appropriate). Cu indicates all of the remainder of the composition (Bal.). The compositions may include unavoidable impurities.

According to Table 1, samples 1 to 7 have the specific resistance of 115 μΩ·cm or less, thus failing to satisfy at least the proper condition 1). Sample 8 fails to satisfy the proper condition 2).

Sample 9 satisfies all of the proper conditions 1) to 4), and is found to be a composition that can be applied as the alloy for the resistive body.

Samples 10, 11 fail to satisfy the proper condition 3).

Samples 12 to 14 satisfy all of the proper conditions 1) to 4), and are therefore found to be compositions that can be applied as the alloy for the resistive body.

Sample 15 fails to satisfy the proper condition 2).

Samples 16 to 19 satisfy all of the proper conditions 1) to 4), and are therefore found to be compositions that can be applied as the alloy for the resistive body.

Sample 20 fails to satisfy the proper condition 2).

Sample 21 satisfies all of the proper conditions 1) to 4), and is therefore found to be a composition that can be applied as the alloy for the resistive body.

Samples 22, 23 fail to satisfy the proper condition 1) or 2).

Thus, in the present embodiment, it is preferable that the manganese composition is 33 to 38% by mass, the Ni composition is 8 to 15% by mass, and the remainder is entirely copper.

More specifically, the compositions that allow the appropriate conditions to be obtained may be such that: manganese is 33 to 38% by mass and nickel is 8 to 13% by mass; manganese is 35 to 37% by mass and nickel is 8 to 12% by mass; manganese is 34 to 37% by mass and nickel is 9 to 11% by mass; or manganese is 35 to 38% by mass and nickel is 9 to 15% by mass.

Fe may be added by 0 to 0.5% by mass, or Sn may be added by 0 to 0.5% by mass.

1) to 4), compares favorably with the alloys of the comparative examples in electric characteristics, and is, in particular, better in processability.

The component ranges of the alloy in Patent Literature 1 are as follows.

1) Composition

Manganese is 23 to 28% by mass, Ni is 9 to 13% by mass, and Sn is up to 3. The remainder is copper.

The characteristics are as follows:

Specific resistance: 50 μΩ·cm to 200 μΩ·cm

TCR: 20° C. to 110° C. range, with ΔR having a second 0 tolerance.

Thermoelectromotive force with respect to copper: ±1.0 μV/K

In particular, it can be seen that the specific resistance can be made higher in the present embodiment.

It is noted that in the present embodiment, tin may be added to shift the TCR value toward the negative side. By adding iron, both the TCR value and the thermoelectromotive force with respect to copper can be shifted toward the negative side. Preferably, tin is included in a range of not more than 0.5% by mass, or iron is included in a range of not more than 0.5% by mass. Preferably, tin or iron is included in a range of more than or equal to 0.3% by mass. A part of the nickel may be substituted by tin or iron.

As described above, using the alloy for the resistive body according to the present embodiment, it is possible to provide a resistive alloy that achieves a high specific resistance on the order of 130 μΩ·cm (specifically, specific resistance of 117 to 143 μΩ·cm), and that has improved processability compared to nickel-chromium alloys and iron-chromium based alloys.

When designing a shunt resistor using a resistance material with a low specific resistance, if a shunt resistor on the high resistance side is desired to be fabricated, design

TABLE 2

| Sample | Composition (% by mass) | | | | | Specific resistance | TCR ($\times 10^{-6}$/K) | Thermoelectromotive force with respect to copper (μV/K) | Vickers hardness |
|---|---|---|---|---|---|---|---|---|---|
| | Cr | Al | Cu | Ni | Fe | (μΩ · cm) | 25-100° C. | 0-100° C. | (HV) |
| Comparative example 1 | 20 | — | — | Bal. | — | 108 | 80 | 4 | 200 |
| Comparative example 2 | 20 | 2.5 | 2.5 | Bal. | — | 130 | 23 | 1 | 200 |
| Comparative example 3 | 25 | 5 | — | — | Bal. | 140 | −13 | −2 | 250 |

Table 2 shows the features of conventional Ni—Cr based and Fe—Cr based materials as comparative examples.

In comparative example 1, Cr is 20% by mass and Ni is the entire remainder. Comparative example 1 fails to satisfy the proper conditions 1) to 4).

In comparative example 2, Cr is 20% by mass, Al is 2.5% by mass, Cu is 2.5% by mass, and the entire remainder is Ni. In this case, the proper conditions 1) to 3) are satisfied, and the proper condition 4) is also satisfied. However, it can be seen that alloys of the present invention are better in processability.

In comparative example 3, Cr is 25% by mass, Al is 5% by mass, and Fe is the entire remainder (Ni). In this case, while the proper conditions 1) to 3) are satisfied, the proper condition 4) is not satisfied.

From the above, it can be seen that the alloy according to the present embodiment satisfies all of the proper conditions constraints may be encountered, such as making the resistive body thin or requiring a length of the resistive body. However, even in such cases, using a resistive body with a high specific resistance according to the present embodiment makes it possible to ensure freedom of design of the shunt resistor.

Further, using the resistive alloy with a high specific resistance makes it possible to relatively reduce the contribution, in the resistor as a whole, of the TCR of Cu used as the electrodes. Thus, a shunt resistor taking advantage of the characteristics of the resistive alloy can be realized.

Second Embodiment

Figure 3:
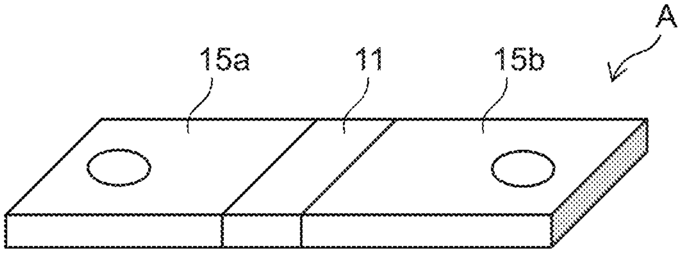
FIG. 3 is a perspective view of an example of a shunt resistor in which the ternary alloy of the alloy for the resistive body including copper, manganese, and nickel according to a first embodiment of the present invention is used as the resistive body material.

Next, a second embodiment of the present invention will be described. FIG. 3 is a perspective view of a configuration example of a shunt resistor in which the alloy for a resistor according to the first embodiment of the present invention is used.

The shunt resistor A illustrated in FIG. 3 has a structure in which Cu electrodes 15*a*, 15*b* are butt-welded to both ends of a unitary piece of a resistive body 11, which is obtained by pressing or the like.

The resistive body 11 and the electrodes 15*a*, 15*b* can be joined by electron beam (EB) welding, laser beam (LB) welding, or the like. The shunt resistor A illustrated in FIG. 3 is a relatively large shunt resistor, and may be made one by one. The material of the resistor may be the one described with reference to the first embodiment, where manganese is 33 to 38 (% by mass), Ni is 8 to 15 (% by mass), and the remainder being copper. Also, the alloys described in the first embodiment may be used in accordance with the purpose.

In the shunt resistor according to the present embodiment, due to the use of a resistor having a high specific resistance, it is possible to ensure freedom of design of the shunt resistor.

Further, the use of the resistive alloy having a high specific resistance makes it possible to relatively reduce the contribution, in the resistor as a whole, of the TCR of Cu used as the electrodes. Thus, a shunt resistor taking advantage of the characteristics of the resistive alloy can be realized.

Third Embodiment

Next, a third embodiment of the present invention will be described. This is an example of manufacture in which an elongated joined material is made by joining a resistor and electrodes, and then performing punching/cutting. In this way, a relatively small shunt resistor can be mass-produced.

Figure 4A:
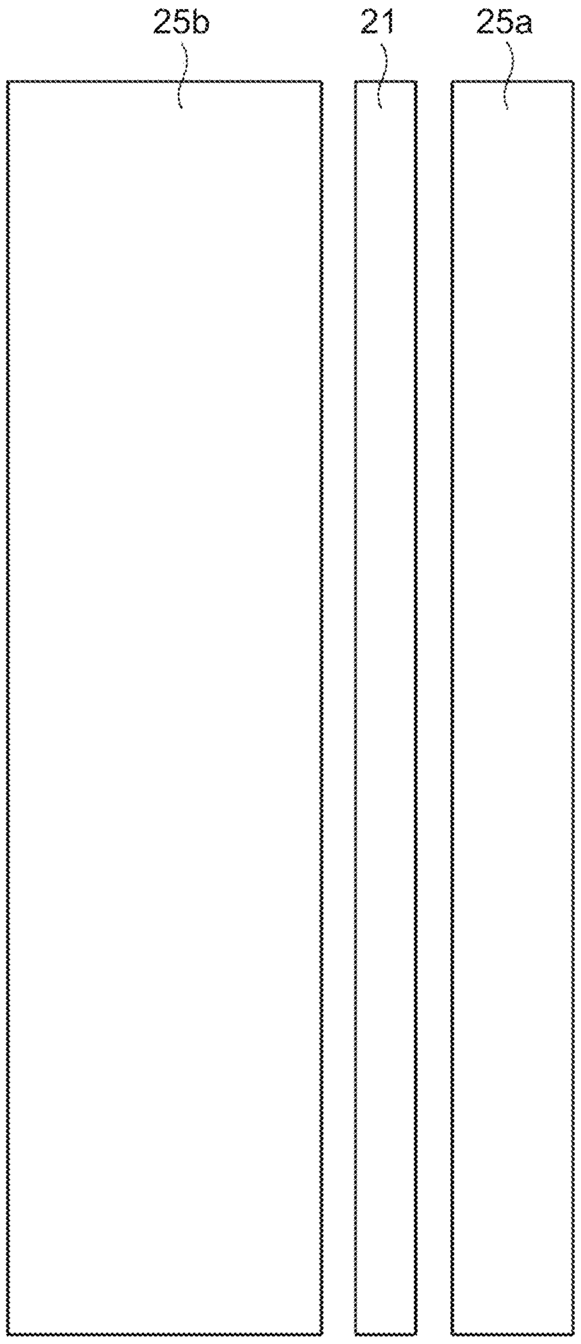
FIG. 4A illustrates an example of a manufacturing process for a shunt resistor in which a ternary alloy of an alloy for a resistive body including copper, manganese, and nickel according to a second embodiment of the present invention is used as the resistive body material.

In the following, an example of such manufacturing process is described. FIG. 4A to FIG. 4F illustrate an example of the manufacturing process for the shunt resistor according to the present embodiment For example, as illustrated in FIG. 4A. an elongated resistive material 21 having a flat plate shape or the like, and a similarly elongated and flat plate-shaped first electrode material 25*a* and second electrode material 25*b* are prepared.

Figure 4B:
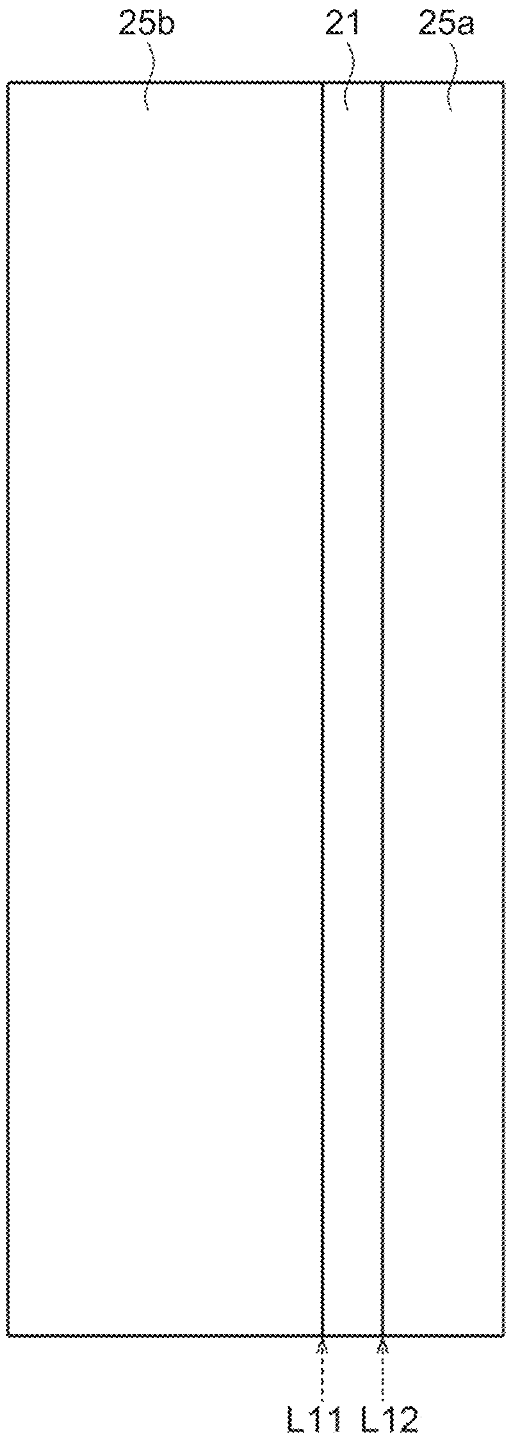
FIG. 4B illustrates an example of a manufacturing process, continuing from FIG. 4A, for the shunt resistor in which the ternary alloy of the alloy for the resistive body including copper, manganese, and nickel according to the second embodiment of the present invention is used as the resistive body material.

As illustrated in FIG. 4B, the first electrode material 25*a* and the second electrode material 25*b* are arranged on both sides of the resistive material 21.

Figure 4C:
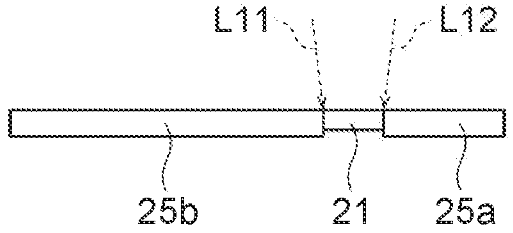
FIGS. 4CA and 4CB illustrate examples of a manufacturing process, continuing from FIG. 4B, for the shunt resistor in which the ternary alloy of the alloy for the resistive body including copper, manganese, and nickel according to the second embodiment of the present invention is used as the resistive body material.
Figure 4C:
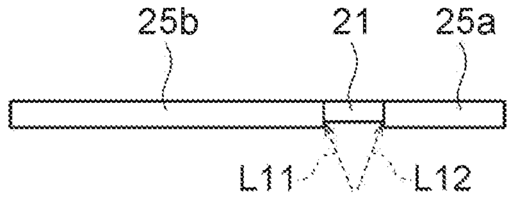

As also illustrated in FIGS. 4CA and 4CB, for example, welding is performed by means of an electron beam or a laser beam to obtain a single flat plate (joined at L11, L12). Specifically, the locations irradiated by the electron beam or the like are those illustrated in FIG. 4CA or FIG. 4CB. FIG. 4CA is an example in which the electron beam or the like irradiates a flat surface side formed by the electrode materials 25*a*, 25*b* and the resistor 21. FIG. 4CB is an example in which the electron beam or the like irradiates the inside of a recess formed by the electrode materials 25*a*, 25*b* and the resistor 21. The surfaces of the electrode materials 25*a*, 25*b* protruding beyond the resistor 21 are not irradiated with the electron beam or the like so as to be less affected.

The difference in the thickness between the resistive material 21 and the electrode materials 25*a*, 25*b* may be used to adjust the resistance value. Further, a step (Δh2) may be formed, as will be described later. Depending on the joint position, it is also possible to perform various adjustments regarding the resistance value or shape.

Figure 4D:
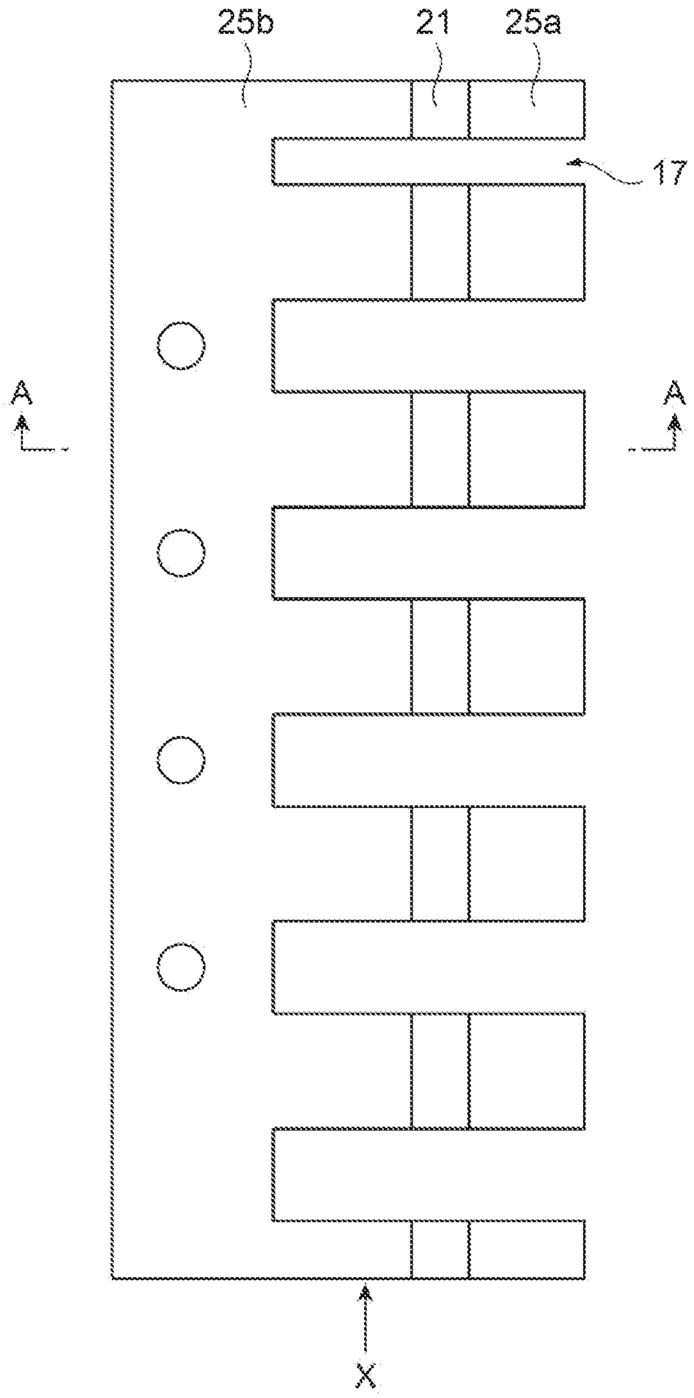
FIGS. 4DA and 4DB illustrate examples of a manufacturing process, continuing from FIGS. 4CA and 4CB, for the shunt resistor in which the ternary alloy of the alloy for the resistive body including copper, manganese, and nickel according to the second embodiment of the present invention is used as the resistive body material.
Figure 4D:
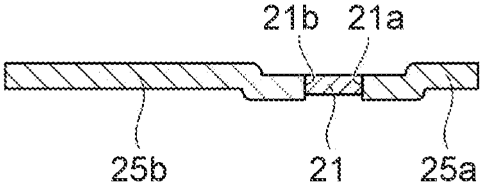

Then, as illustrated in FIG. 4DA, the flat plate is punched, for example, in a comb-teeth shape from the state of FIG. 4B, thereby removing regions indicated by reference sign 17, including regions of the resistor 21. Then, parts of the first electrode material 25*a* and the second electrode material 25*b* are bent by means of pressing or the like, forming a structure having a cross-sectional shape shown in cross section in FIG. 4DB. The reference signs 21*a, b* indicate the welded portions where connections are made by the irradiation with an electron beam or the like.

Figure 4E:
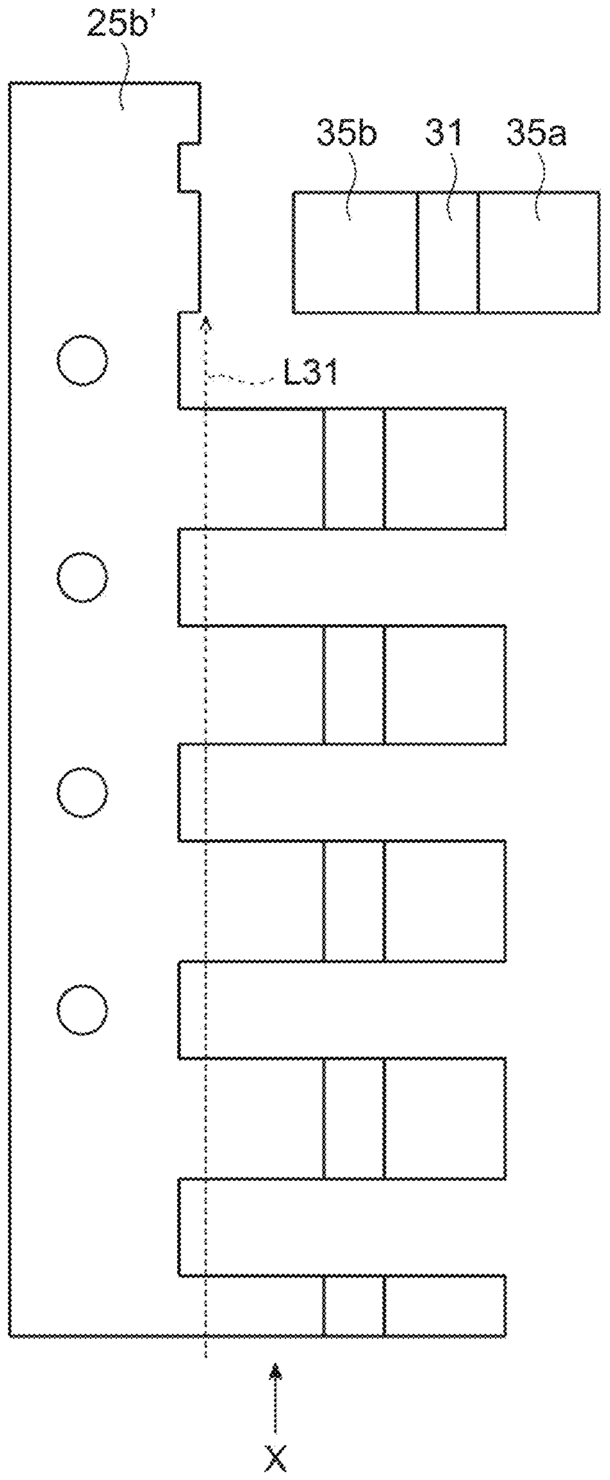
FIG. 4E illustrates an example of a manufacturing process, continuing from FIGS. 4DA and 4DB, for the shunt resistor in which the ternary alloy of the alloy for the resistive body including copper, manganese, and nickel according to the second embodiment of the present invention is used as the resistive body material.

Then, as illustrated in FIG. 4E, an other-end side (35*b*) on which the electrode is not cut off is cut off from the remaining region (base portion) 25*b*' along L31. This forms the resistor of the butted-structure for use in a current detecting device according to the first embodiment. Using the manufacturing method according to the present embodiment provides the advantage of enabling mass production of the resistor comprising the electrodes 35*a*, 35*b* and the resistor 31.

Figure 4F:
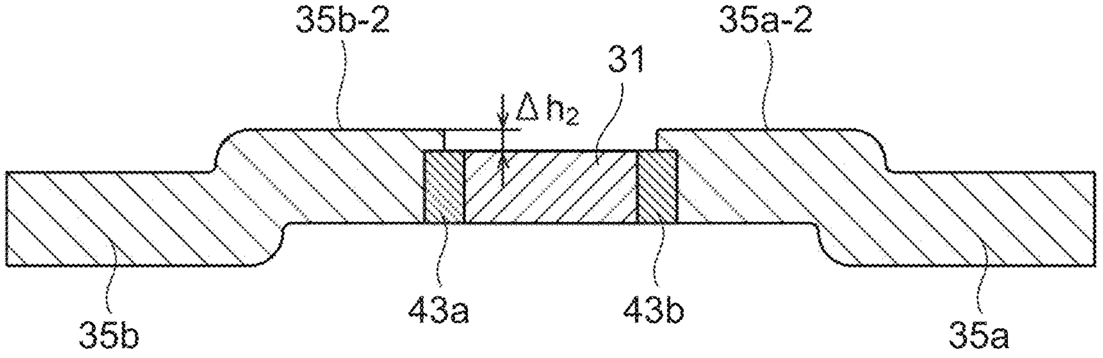
FIG. 4F illustrates an example of a manufacturing process, continuing from FIG. 4E, for the shunt resistor in which the ternary alloy of the alloy for the resistive body including copper, manganese, and nickel according to the second embodiment of the present invention is used as the resistive body material.

As illustrated in FIG. 4F, the resistor has weld seams 43*a*, 43*b* formed therein. Generally, the surface of a weld seam by an electron beam or the like is in a roughened state. For precise current detection, while it is preferable to fix the bonding wires as close to the resistor as possible, the weld seam may get in the way. According to the present example, by the method described with reference to FIGS. 4CA and 4CB, it is possible to avoid the formation of weld seams in regions 35*a*-2, 35*b*-2 providing bonding surfaces. Accordingly, it is possible to obtain the advantage of being able to fix the wires at positions close to the resistor.

In the shunt resistor according to the present embodiment, due to the use of the resistor having a high specific resistance, it is possible to ensure freedom of design of the shunt resistor.

Further, the use of the resistive alloy having a high specific resistance makes it possible to relatively reduce the contribution, in the resistor as a whole, of the TCR of Cu used as the electrodes. Thus, a shunt resistor taking advantage of the characteristics of the resistive alloy can be realized.

Further, the shunt resistive material according to the present embodiment exhibits good processability when rolled during manufacture of the resistive material, or when pressed or the like during manufacture of the resistor.

In the foregoing embodiments, the illustrated configurations and the like are not limiting and may be modified, as appropriate, as long as the effects of the present invention can be obtained. The embodiments may also be modified and implemented, as appropriate, without departing from the range of the objectives of the present invention.

The respective constituent elements of the present invention may be selectively added or omitted as needed, and an invention comprising a selectively added or omitted configuration is also included in the present invention.

INDUSTRIAL APPLICABILITY

The present invention may be utilized as an alloy for a resistor.

All publications, patents and patent applications cited in the present description are incorporated herein by reference in their entirety.

The invention claimed is:

1. A resistor using a resistive body alloy comprising copper, manganese, and nickel, wherein:

the manganese is 33 to 38% by mass;

the nickel is 8 to 15% by mass and the resistive body alloy comprises 0.5% by mass or less of tin, or 0.5% by mass or less of iron.

2. The resistor according to claim 1, wherein the resistive body alloy has a specific resistance of 117 to 143 μΩ·cm.

3. The resistor according to claim 1, wherein the resistive body alloy has a Vickers hardness of 200 HV or less.

* * * * *